United States Patent
Zhang et al.

(10) Patent No.: US 9,428,032 B2
(45) Date of Patent: Aug. 30, 2016

(54) ELECTRIC VEHICLE AND THERMAL MANAGEMENT SYSTEM THEREFOR

(75) Inventors: Rongrong Zhang, Zheijiang (CN); Chuliang Shi, Zhejiang (CN)

(73) Assignee: Hangzhou Sanhua Research Institute Co., Ltd., Hangzhou, Zhejiang (CN)

( * ) Notice: Subject to any disclaimer, the term of this patent is extended or adjusted under 35 U.S.C. 154(b) by 609 days.

(21) Appl. No.: 13/881,040

(22) PCT Filed: Jul. 25, 2011

(86) PCT No.: PCT/CN2011/077550
§ 371 (c)(1),
(2), (4) Date: Apr. 23, 2013

(87) PCT Pub. No.: WO2012/055273
PCT Pub. Date: May 3, 2012

(65) Prior Publication Data
US 2013/0206360 A1  Aug. 15, 2013

(30) Foreign Application Priority Data
Oct. 29, 2010  (CN) .......................... 2010 1 0526741

(51) Int. Cl.
*B60H 1/00* (2006.01)
*B60H 1/22* (2006.01)
(Continued)

(52) U.S. Cl.
CPC ........ *B60H 1/00057* (2013.01); *B60H 1/0005* (2013.01); *B60H 1/00278* (2013.01);
(Continued)

(58) Field of Classification Search
CPC .............. B60H 1/00007; B60H 1/323; B60H 1/00057
See application file for complete search history.

(56) References Cited

U.S. PATENT DOCUMENTS 3,457,324 A * 7/1969 Sekmakas ............. C08F 299/06
  525/170
5,228,301 A * 7/1993 Sjoholm ............ B60H 1/00007
  165/263

(Continued)

FOREIGN PATENT DOCUMENTS

CN  101522447  9/2009
EP  1329344 A1  7/2003
(Continued)

OTHER PUBLICATIONS

Reference CN201555408U cited in 1st Office Action in Chinese Priority Patent Application No. 201010526741.5 Chinese 1st Office Action was issued on Jul. 22, 2013. (pp. 1-5).
(Continued)

*Primary Examiner* — M. Alexandra Elve
*Assistant Examiner* — Alexis Cox
(74) *Attorney, Agent, or Firm* — Boyle Fredrickson, S.C.

(57) ABSTRACT

A thermal management system includes a cooling circuit, a heat exchange circuit, a heat recovery cooling device and a passenger compartment temperature regulating device. The cooling device includes a condenser, a throttling element and an evaporator. The heat exchange device includes a first air cooled heat exchanger and a heater. The heat recovery cooling device includes a pump, a second air cooled beat exchanger and a cooler. The passenger compartment temperature regulating device includes an air flowing passage and a fan arranged in the air flowing passage, or a compartment heat exchanger. The first air cooled heat exchanger and the heater are in communication with the condenser through a first flow regulating valve. The cooler and the heat emission component heat exchanger are in communication with the evaporator through a second flow regulating valve. The second air cooled heat exchanger is selectively connected in series to the heat emission component heat exchanger.

18 Claims, 3 Drawing Sheets

AA DEFROST
BB BLOW AGAINST FACE
CC BLOW AGAINST FEET
DD BLOW AGAINST FACE/ BLOW AGAINST FEET
EE MODULAR AIR VENT

(51) Int. Cl.
*B60H 1/32* (2006.01)
*B60H 1/14* (2006.01)

(52) U.S. Cl.
CPC ...... *B60H1/00392* (2013.01); *B60H 1/00899* (2013.01); *B60H 1/143* (2013.01); *B60H 1/22* (2013.01); *B60H 1/323* (2013.01); *B60H 1/3204* (2013.01); *B60H 1/00007* (2013.01); *B60H 2001/00307* (2013.01); *B60H 2001/00957* (2013.01); *B60H 2001/3288* (2013.01); *B60H 2001/3289* (2013.01)

(56) References Cited

U.S. PATENT DOCUMENTS

| | | | | |
|---|---|---|---|---|
| 5,289,698 | A * | 3/1994 | Garimella | B60H 1/00007 62/239 |
| 5,641,016 | A | 6/1997 | Isaji et al. | |
| 6,435,273 | B1 * | 8/2002 | Futernik | B60H 1/00007 165/202 |
| 7,520,320 | B2 | 4/2009 | Itoh et al. | |
| 7,765,824 | B2 * | 8/2010 | Wong | B60H 1/3226 62/133 |
| 8,424,331 | B2 * | 4/2013 | Monforte | B60H 1/00021 62/175 |
| 9,321,325 | B2 * | 4/2016 | Zhang | B60H 1/143 |
| 2006/0032623 | A1 * | 2/2006 | Tsubone | B60H 1/00492 165/202 |
| 2006/0137853 | A1 * | 6/2006 | Haller | B60H 1/005 165/42 |
| 2007/0131408 | A1 * | 6/2007 | Zeigler | B60H 1/00378 165/240 |
| 2007/0295017 | A1 * | 12/2007 | Pannell | B60H 1/00364 62/236 |
| 2008/0110185 | A1 * | 5/2008 | Veettil | B60H 1/3226 62/115 |
| 2008/0245503 | A1 * | 10/2008 | Wilson | B60H 1/00371 165/42 |
| 2009/0019861 | A1 * | 1/2009 | Heckt | B60H 1/005 62/3.2 |
| 2009/0130513 | A1 | 5/2009 | Tsuchiya et al. | |
| 2012/0031140 | A1 * | 2/2012 | Zhang | B60H 1/143 62/498 |
| 2013/0145790 | A1 * | 6/2013 | Schafer | B60H 1/00899 62/333 |
| 2013/0192271 | A1 * | 8/2013 | Barnhart | F25B 21/04 62/3.3 |

FOREIGN PATENT DOCUMENTS

| | | |
|---|---|---|
| JP | 17329544 | 12/1995 |
| JP | H11286211 A | 10/1999 |
| WO | 0187551 A1 | 11/2001 |

OTHER PUBLICATIONS

European Search Report; EP11835547,8; Feb. 18, 2015.

* cited by examiner

| | |
|---|---|
| AA | DEFROST |
| BB | BLOW AGAINST FACE |
| CC | BLOW AGAINST FEET |
| DD | BLOW AGAINST FACE/ BLOW AGAINST FEET |
| EE | MODULAR AIR VENT |

AA  DEFROST
BB  BLOW AGAINST FACE
CC  BLOW AGAINST FEET
DD  BLOW AGAINST FACE/ BLOW AGAINST FEET
EE  MODULAR AIR VENT

ELECTRIC VEHICLE AND THERMAL MANAGEMENT SYSTEM THEREFOR

The present application claims the benefit of priority of Chinese Patent Application No. 201010526741.5, entitled "ELECTRIC VEHICLE AND THERMAL MANAGEMENT SYSTEM THEREFOR", filed with the Chinese State Intellectual Property Office on Oct. 29, 2010, the entire disclosure of which is incorporated herein by reference.

FIELD OF THE INVENTION

The present application relates to the technical field of distribution and use of heat, and particularly to a thermal management system. The present application also relates to an electric vehicle including the thermal management system.

BACKGROUND OF THE INVENTION

The electric vehicle will become the trend of development of vehicles in the future due to characteristics of energy saving and environmental protection.

With the development of the vehicle, more and more attention has been paid to comfort inside a compartment. For the conventional vehicle with an internal combustion engine, the residual heat of the internal combustion engine and the heat of the engine exhaust may be used to heat the compartment, and the temperature of the circulating water of the vehicle with the internal combustion engine is generally greater than 80 degrees in the state of the vehicle normal traveling, which may basically meet the heating requirement of the compartment under various conditions. However, the power of the electric vehicle mainly comes from the electric motor, and the temperature of the circulating cooling water of the electric vehicle is only 50 degrees since the heat of the engine may not be used, which has difficulty in satisfying the heating requirement. On the other hand, the electric vehicle is provided therein with a plurality of heat generating components, for example, motor frequency converter, battery, etc., which are needed to be cooled by using respective cooling devices so as to ensure that the above components can work within the allowed temperature range.

In the prior art, in order that the temperature inside the compartment of the electric vehicle is maintained at a level that the human body feels comfortable, a variety of ways are used to provide heat to the compartment in the prior art: first, using an independent heat source, i.e. PTC, or fuels such as gasoline, kerosene and ethanol, to heat; second, using the residual heat of the a recovery equipment and auxiliary independent heat sources; and third, using a heat pump to ensure that the temperature inside the compartment is always maintained within a comfortable temperature range. On the other hand, in order to ensure that the heat generating components work within a normal temperature range, in the prior art, an air-cooled radiator, together with circulating water, is generally used to achieve the cooling of the above components.

However, among the various heating ways described above, if the independent heat source, such as PTC, is adopted to heat, a lot of battery energy will be consumed, resulting in a reduced travel distance of the vehicle; if fuels are used to heat, not only low heating efficiency but also environmental pollution may occur, and the load of the vehicle may be increased. On the other hand, independent radiators are needed to remove the heat of the heat generating components. In this way, the heat is not better used, and the heat generating components are poorly cooled under a high ambient temperature, and cannot work at the optimum temperature. Furthermore, as the environmental protection is increasingly concerned, new environmentally friendly refrigerant (e.g. R1234yf and R152a, etc.) will be gradually introduced in the future air conditioner of the electric vehicle. Such refrigerant is expensive and flammable, which may become problems existing in the present thermal system of the electric vehicle.

Therefore, at present, technical problems to be solved urgently by those skilled in the art are to improve the reasonableness of using the heat of the heat generating components of the electric vehicle and the effect of cooling the heat generating components, to improve the comfort of the compartment of the electric vehicle, to achieve the overall management of the thermal system of the electric vehicle, to reduce the charging amount of the refrigerant, and to prevent the refrigerant from entering into the compartment.

SUMMARY OF THE APPLICATION

An object of the present application is to provide a thermal management system, which is able to ensure the sufficient use of the heat of the heat generating components of the electric vehicle, thus reducing the heat waste, meanwhile improving the effect of cooling the heat generating components and the comfort of the compartment, reducing the charging amount of the refrigerant, preventing the refrigerant from entering into the compartment. Another object of the present application is to provide an electric vehicle including the above thermal management system.

In order to solve the problems described above, the present application provides a thermal management system for an electric vehicle, including a heat recovery cooling device, a refrigerating device or refrigerating circuit, a heat dissipating device and a compartment temperature adjusting device, wherein the refrigerating device includes a compressor, a condenser, a throttling element and an evaporator that are connected by pipelines;

the heat dissipating device includes a first air-cooled heat exchanger and a heater that are connected by pipelines;

the heat recovery cooling device includes a heat exchanger for heat generating components, a second air-cooled heat exchanger and a cooler that are connected by pipelines;

the compartment temperature adjusting device includes the heater and the cooler that are arranged in series;

the first air-cooled heat exchanger and the heater communicate with the condenser via a first flow regulating valve; the cooler and the heat exchanger for heat generating components communicate with the evaporator via a second flow regulating valve, and the second air-cooled heat exchanger is selectively connected in parallel with the beat exchanger for heat generating components.

Preferably, the compartment temperature adjusting device is an air circulating device. The air circulating device includes an air flowing passage that communicates a circulation vent with the compartment of the electric vehicle, and the cooler and the heater are arranged in the air flowing passage.

Preferably, the compartment temperature adjusting device is a medium circulating device. The medium circulating device includes a heat exchanger within the compartment.

The cooler, the heater and the heat exchanger within the compartment are connected in series by pipelines.

Preferably, the first flow regulating valve is a three-way proportional regulating valve, with three valve ports thereof respectively communicating with the first air-cooled heat exchanger, the heater and the condenser.

Preferably, the second flow regulating valve is a three-way proportional regulating valve, with three valve ports thereof respectively communicating with the cooler, the heat exchanger for heat generating components and the evaporator.

Preferably, the second air-cooled heat exchanger is selectively connected in parallel with the heat exchanger for heat generating components via a three-way valve. Three valve ports of the three-way valve are respectively connected with the evaporator, the second air-cooled heat exchanger and the heat exchanger for heat generating components.

Preferably, the heat exchanger for heat generating components includes a heat exchanger for a frequency converter and a heat exchanger for a battery.

Preferably, the heat exchanger for the frequency converter and the heat exchanger for the battery are connected in parallel.

Preferably, a balance regulating valve is also connected in the circuit of each of the heat exchanger for the frequency converter and the heat exchanger for the battery.

Preferably, circulating medium in the refrigerating device and circulating medium in the heat recovery cooling device are hermetically isolated from each other; and circulating medium in the refrigerating device and circulating medium in the heat dissipating device are hermetically isolated from each other.

Preferably, the refrigerating device further includes an internal heat exchanger. Two passages of the internal heat exchanger communicate with the evaporator and the compressor, and communicate with the condenser and the throttling element respectively.

In order to solve the problems described above, the present application provides an electric vehicle including a compartment, heat generating components and the thermal management system described above.

The thermal management system for the electric vehicle according to the present application includes a heat recovery cooling device, a refrigerating device, a heat dissipating device and a compartment temperature adjusting device, wherein, the refrigerating device includes a compressor, a condenser, a throttling element and an evaporator that are connected by pipelines; the heat dissipating device includes a first air-cooled heat exchanger and a heater that are connected by pipelines; the heat recovery cooling device includes a heat exchanger for heat generating components, a second air-cooled beat exchanger and a cooler that are connected by pipelines; the compartment temperature adjusting device includes the heater and the cooler that are arranged in series; the first air-cooled heat exchanger and the heater communicate with the condenser via a first flow regulating valve; the cooler and the heat exchanger for heat generating components communicate with the evaporator via a second flow regulating valve, and the second air-cooled heat exchanger is selectively connected in parallel with the heat exchanger for heat generating components.

In operation, the refrigerant flows at high temperature and high pressure through the condenser under the action of the compressor, and transfers heat to the medium within the heat dissipating device via the condenser, raising the temperature of the medium within the heat dissipating device. Then, the refrigerant preliminarily cooled flows through the throttling element, achieving the further cooling of the refrigerant by changing the state of the refrigerant. Then, the refrigerant with lower temperature flows through the evaporator, absorbing the heat of the medium within the heat recovery cooling device, and thus reducing the temperature of the medium within the heat recovery cooling device. The refrigerant that has absorbed heat is brought into the next circulation under the action of the compressor, and continuously transfers the heat of the heat recovery cooling device to the heat dissipating device. The medium in the heat recovery cooling device proportionally flows through the heat exchanger for heat generating components and the cooler under the regulating action of the second flow regulating valve. The medium passing through the heat exchanger for heat generating components absorbs the heat of the heat generating components, so as to achieve the purpose of cooling the heat generating components, while the medium passing through the cooler absorbs the heat of the medium in the compartment temperature adjusting device, so as to achieve the purpose of cooling the medium in the compartment temperature adjusting device. The medium in the heat recovery cooling device that has absorbed heat brings the heat to the evaporator, and transfers the heat to the refrigerant in the refrigerating device. Besides, the connection state of the second air-cooled heat exchanger of the heat recovery cooling device is changed according to the temperature of the external surroundings such that the second air-cooled heat exchanger is in a working state or a non-working state. When the second air-cooled heat exchanger is in a working state, the medium in the second air-cooled heat exchanger can absorb the heat in the air or release heat into the air according to the temperature of outside air and the temperature of the medium, so as to assist in heat absorption or heat radiation. The medium in the heat dissipating device proportionally flows through the first air-cooled heat exchanger and the heater under the regulating action of the first flow regulating valve. The medium flowing through the first air-cooled heat exchanger dissipates heat to the air, so as to reduce the temperature of the medium, while the medium flowing through the heater heats the medium of the compartment temperature adjusting device. As a result, under the combined action of the heater and the cooler, the compartment temperature adjusting device reaches the required temperature, thus achieving the adjustment of the compartment temperature and satisfying the requirement of the comfort of the compartment.

It can be seen that the thermal management system for the electric vehicle according to the present application uses the medium in the heat recovery cooling device to absorb the heat of the heat generating components and/or the heat of the medium in the compartment temperature adjusting device, and the heat is transferred to the refrigerant within the refrigerating device by the evaporator, thereby achieving the purpose of cooling the heat generating components and the medium of the compartment temperature adjusting device. The cooling of the heat generating components ensures the normal operation of the heat generating components, and the cooling of the medium of the compartment temperature adjusting device preliminarily prepares for the adjustment of the compartment temperature. Under the action of the compressor, the refrigerant that has absorbed heat flows through the condenser, so that the heat is transferred to the medium of the heat dissipating device via the condenser; and then, the medium within the heat dissipating device flows through the first air-cooled heat exchanger and/or the heater, so that the heat is dissipated into the air via the first air-cooled heat exchanger, or is used to heat the medium of the compartment temperature adjusting device. In this way, the medium can meet the temperature requirement, and finally allow the compartment to be at the required temperature. Thus, the thermal management system according to the present application transfers the heat of the heat generating components into the compartment, thereby achieving the cooling of the heat generating components and the adjustment of the compartment temperature. As such, the heat within the electric vehicle may be utilized reasonably, that is, relatively few devices and relatively simple connecting circuit are used to achieve the reasonable heat transfer, improve the utilization factor of the heat, and comprehensively solve the problems existing in the heat dissipation of the heat generating components, in the temperature control of the compartment and in the reasonable use of the heat, thereby achieving the overall management of the thermal system of the electric vehicle. On the other hand, various devices can select different mediums, so the new environmentally friendly refrigerant (such as R1234yf and R152a and the like) can be used in the refrigerating device, thereby reducing the charging amount of the flammable refrigerant; further, the refrigerating device containing flammable refrigerant can be provided outside the compartment, so as to completely avoid the refrigerant from entering the compartment, thereby improving the security.

The electric vehicle according to the present application may produce the similar beneficial effects as that of the thermal management system described above, which will not be described in detail herein.

DETAILED DESCRIPTION OF THE APPLICATION

An object of the present application is to provide a thermal management system, which is able to ensure the sufficient use of the heat of the heat generating components of the electric vehicle, thus reducing the heat waste, meanwhile improving the effect of cooling the heat generating components and the comfort of the compartment, reducing the charging amount of the refrigerant, preventing the refrigerant from entering into the compartment. Another object of the present application is to provide an electric vehicle including the above thermal management system.

In order to make those skilled in the art to better understand solutions of the present application, the present application will be further described in detail in conjunction with the drawings and specific embodiments.

Figure 1:
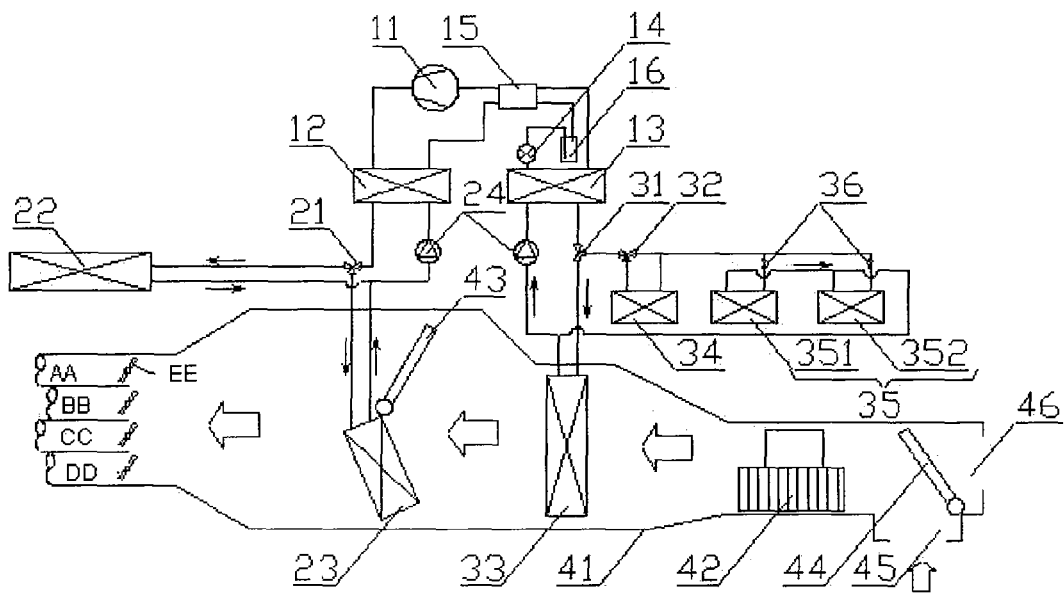
FIG. 1 is a schematic structural view of a thermal management system in a first working mode according to a first embodiment of the present application.
Figure 2:
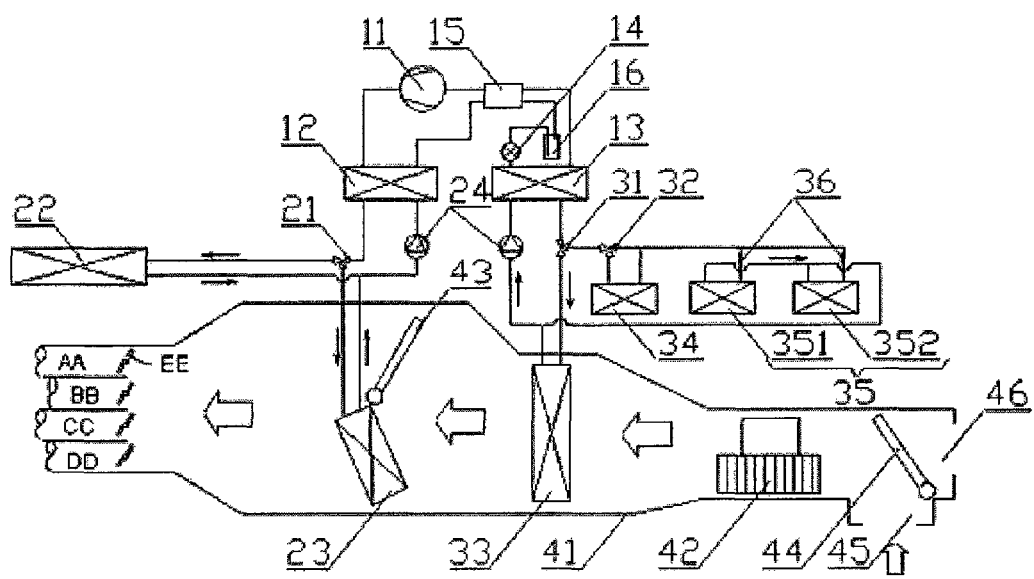
FIG. 2 is a schematic structural view of the thermal management system shown in FIG. 1 in a second working mode.

Referring to FIGS. 1 and 2, FIG. 1 is a schematic structural view of a thermal management system in a first working mode according to a first embodiment of the present application; and FIG. 2 is a schematic structural view of the thermal management system shown in FIG. 1 in a second working mode.

In the first embodiment, the thermal management system for the electric vehicle according to the present application includes a heat recovery cooling device, a refrigerating device, a heat exchanging device or heat exchanging circuit and a compartment temperature adjusting device. The refrigerating device includes a compressor 11, a condenser 12, a throttling element 14 and an evaporator 13 that are connected with each other by pipelines. The heat exchanging device includes a first air-cooled heat exchanger 22 and a heater 23 that are connected by pipelines. The heat recovery cooling device includes a heat exchanger 35 for heat generating components, a second air-cooled heat exchanger 34 and a cooler 33 that are connected with each other by pipelines. The compartment temperature adjusting device enables medium to flow through the heater 23 and the cooler 33 arranged in series, or through one of the heater 23 and the cooler 33, and delivers the medium with adjusted temperature to the compartment, so as to adjust the temperature of the compartment. Both the first air-cooled heat exchanger 22 and the heater 23 communicate with the condenser 12 through a first flow regulating valve 21 or other flow regulating devices. Both the cooler 33 and the heat exchanger 35 for heat generating components communicate with the evaporator 13 through a second flow regulating valve 31 or other flow regulating devices. The second air-cooled heat exchanger 34 may be selectively connected in parallel with the heat exchanger 35 for heat generating components. The condenser 12 and the evaporator 13 are double-flow passage heat exchangers. Certainly, in order to ensure the heat transfer direction of the various components, the circulating medium inside the refrigerating device and the circulating medium inside the heat recovery cooling device are hermetically isolated from each other. The circulating medium inside the refrigerating device and the circulating medium inside the heat exchanging device are hermetically isolated from each other, and may be of different kinds.

Specifically, the expression "the second air-cooled heat exchanger 34 may be selectively connected in parallel with the heat exchanger 35 for heat generating components" described herein means that, depending on various external surroundings and different adjusting requirements, the second air-cooled heat exchanger 34 can be selectively connected in parallel with the heat exchanger 35 for heat generating components, or not be connected in parallel with the heat exchanger 35 for heat generating components at all. The first flow regulating valve 21 described herein is used to regulate the proportion of the medium flowing to the first air-cooled heat exchanger 22 and the heater 23, thereby controlling the heater 23 to adjust the temperature of the medium in the compartment temperature adjusting device. Similarly, the second flow regulating valve 31 described herein is used to regulate the proportion of the medium flowing to the heat exchanger 35 for heat generating components and the cooler 33, thereby controlling the cooler 33 to adjust the temperature of the medium in the compartment temperature adjusting device, and controlling the heat exchanger 35 for heat generating components to control the cooling temperature of the heat generating components. The first flow regulating valve 21 and the second flow regulating valve 31 can ensure that the thermal management system according to the present application effectively controls the heat generating components and the temperature in the compartment.

The compressor 11 of the refrigerating device provides power for the circulation of the refrigerant. Since the refrigerant flowing out of the outlet of the compressor 11 is in the state of high temperature and high pressure, the condenser 12 connected to the outlet of the compressor 11 absorbs the heat from the refrigerant via the heat exchanging device so as to reduce the temperature of the refrigerant, and then the refrigerant passes through the evaporator 13 to absorb the heat from the medium of the heat recovery cooling device. Further, since the amount of the refrigerant circulating in the circuit is different in the states of cooling and heating, a reservoir 16 can also be provided in the circuit. The throttling element 14 may further reduce the temperature of the refrigerant, and thus is arranged between the condenser 12 and the evaporator 13. Specifically, the throttling element 14 may be an electronic expansion valve or any other element that can achieve the throttling and cooling function. Furthermore, an internal heat exchanger 15 also can be arranged in the circuit of the refrigerating device. As shown in the drawings, two passages of the internal heat exchanger 15 communicate with the evaporator 13 and the compressor 11, and communicate with the condenser 12 and the throttling element 14, respectively. Thus, the refrigerant from the outlet of the evaporator 13 may be used to cool the refrigerant from the outlet of the condenser 12 via the internal heat exchanger 15, thereby changing the temperature and pressure of the refrigerant. In this way, it is possible to improve the efficiency of the entire refrigeration system and save energy consumption.

In order to ensure the reliable circulation of the medium, the heat exchanging device and the heat recovery cooling device each can be provided with a power pump 24, and a expansion tank (not shown) may be further provided in the circulation circuit of the medium of the two devices. The expansion tank is not only able to supplement leaked circulating medium so as to ensure that there is always medium at the suction port of the power pump 24, but also able to discharge bubbles in the medium so as to prevent the bubbles from affecting the cooling effect.

The compartment temperature adjusting device enables medium to flow through the heater 23 and the cooler 33 arranged in series, or through one of the heater 23 and the cooler 33, so as to adjust the temperature of the medium, and finally, enables the medium with satisfied temperature to flow through the compartment of the electric vehicle, so as to adjust the temperature of the compartment.

In operation, when it is only needed to cool the heat generating components and the load of the heat generating components is relatively large, the states of the first flow regulating valve 21 and the second flow regulating valve 31 are firstly adjusted such as to close the circuit in which the heater 23 and the cooler 33 are located, and thus to stop the adjustment of the temperature of the compartment. Then, the compressor 11 is actuated so that the refrigerating device can be used to cool the heat generating components. The refrigerant flows at high temperature and high pressure through the condenser 12 under the action of the compressor 11, and transfers heat to the medium within the heat exchanging device via the condenser 12 so as to raise the temperature of the medium within the heat exchanging device. Then, the cooled refrigerant flows through the throttling element 14, achieving the further cooling of the refrigerant by changing the state of the refrigerant. Then, the refrigerant with lower temperature flows through the evaporator 13, absorbing the heat of the medium within the heat recovery cooling device, and thus reducing the temperature of the medium within the heat recovery cooling device. The refrigerant that has absorbed heat is brought into the next circulation under the action of the compressor 11, and continuously transfers the heat of the heat recovery cooling device to the heat exchanging device. In this case, the second air-cooled heat exchanger 34 is not needed to put into use, and thus is bypassed to be in a non-operating state (specifically as shown in FIG. 1). As can be seen, the thermal management system according to the present application transfers the heat of the heat generating components through the heat recovery cooling device, the refrigerating device and the heat exchanging device, and finally dissipates the heat into the external surroundings through the first air-cooled heat exchanger 22, thus achieving the cooling of the heat generating components.

When the load of the heat generating components, as well as the heat generated therefrom, is small, only the heat recovery cooling device may be used to achieve cooling without the use of the refrigerating device and the heat exchanging device. In this case, the state of the second flow regulating valve 31 is also needed to be adjusted such as to close the circuit in which the cooler 33 is located. Besides, the second air-cooled heat exchanger 34 and the heat exchanger 35 for heat generating components are connected in parallel (specifically as shown in FIG. 2). Thus, the second air-cooled heat exchanger 34 may be used to directly release the heat of the heat generating components into the surroundings, thereby achieving the cooling of the heat generating components.

When it is needed to cool the heat generating components and to adjust the temperature of the compartment, firstly, the states of the first flow regulating valve 21 and the second flow regulating valve 31 are adjusted according to the load of the heat generating components and the temperature requirement of the compartment such as to control the flow of medium flowing through the heater 23 and the cooler 33, and the compressor 11 is actuated. Thus, when the refrigerant is circulated in the circuit of the refrigerating device under the action of the compressor 11, and the medium is circulated in the circuits of the heat exchanging device and the heat recovery cooling device, the heat of the heat generating components and the medium of the compartment temperature adjusting device are transferred and distributed to the first air-cooled heat exchanger 22 and the heater 23, thereby achieving the cooling of the heat generating components and the adjustment of the compartment temperature.

In the working state described above, the second air-cooled heat exchanger 34 may be set in different states according to the different heat required for the compartment. When the second air-cooled heat exchanger 34 is connected in parallel to the circuit, the medium in the heat recovery cooling device not only can absorb the heat of the heat generating components, but also can absorb the heat of the external surroundings, thus achieving the stepped heat increase and improving the efficiency of the system. When the second air-cooled heat exchanger 34 is bypassed not to work, the working efficiency of the system can be improved.

Further, in operation, the first flow regulating valve 21 and the second flow regulating valve 31 may be adjusted, as required, such as to control the turn-on or turn-off of the circuit in which the heater 23 and the cooler 33 are located, and to control the flow of the medium in the circuit, thereby ensuring the effective adjustment of the compartment temperature and improving the comfort of the compartment.

It can be seen that the thermal management system for the electric vehicle according to the present application uses the medium in the heat recovery cooling device to absorb the heat of the heat generating components and/or the heat of the medium in the compartment temperature adjusting device, and the heat is transferred to the refrigerant within the refrigerating device by the evaporator 13, thereby achieving the purpose of cooling the heat generating components and the medium of the compartment temperature adjusting device. The cooling of the heat generating components ensures the normal operation of the heat generating components, and the cooling of the medium of the compartment temperature adjusting device preliminarily prepares for the adjustment of the compartment temperature. Under the action of the compressor 11, the refrigerant that has absorbed heat flows through the condenser 12, so that the heat is transferred to the medium of the heat exchanging device via the condenser 12; and then, the medium within the heat exchanging device flows through the first air-cooled heat exchanger 22 and/or the heater 23, so that the heat is dissipated into the air via the first air-cooled heat exchanger 22, or is used to heat the medium of the compartment temperature adjusting device via the heater 23. In this way, the medium of the compartment temperature adjusting device can meet the temperature requirement, and finally allows the compartment to be at the required temperature.

Thus, the thermal management system according to the present application transfers the heat of the heat generating components into the compartment, thereby achieving the cooling of the heat generating components and the adjustment of the compartment temperature. As such, the heat within the electric vehicle may be utilized reasonably, that is, relatively few devices and relatively simple connecting circuit are used to achieve the reasonable heat transfer, improve the utilization factor of the heat, and comprehensively solve the problems existing in the heat dissipation of the heat generating components, in the temperature control of the compartment and in the reasonable use of the heat, thereby achieving the overall management of the thermal system of the electric vehicle. On the other hand, various devices can select different mediums, so the new environmentally friendly refrigerant (such as R1234yf and R152a and the like) can be used in the refrigerating device, thereby reducing the charging amount of the flammable refrigerant. Further, the refrigerating device can be provided outside the compartment so as to completely avoid the refrigerant from entering the compartment, thereby improving the security.

In a specific embodiment, as shown in FIGS. 1 and 2, the compartment temperature adjusting device for the electric vehicle according to the present application may be an air circulating device. The air circulating device includes an air flowing passage 41 that communicates a circulation vent with the compartment of the electric vehicle. The cooler 33 and the heater 23 are arranged in the air flowing passage 41, with the heater 23 being close to the compartment. In this way, in air circulation, the air can firstly passes through the cooler 33 to be cooled and to be dehydrated, and then passes through the heater to further adjust the temperature, thus ensuring the aridity of the air into the compartment and better achieving the function of the defogging. Of course, in another embodiment, the cooler 33 and the heater 23 may also be arranged in different order such as to adjust the temperature of the air. Furthermore, as required, either the cooler 33 or the heater 23 may be passed through.

Specifically, the above circulation vent may include an internal circulation vent 45 and an external circulation vent 46. The internal circulation vent 45 communicates with the inside of the compartment directly through pipelines, while the external circulation vent 46 directly communicates with the external surroundings. An internal-external circulation damper 44 is provided at the intersection between the internal circulation vent 45 and the external circulation vent 46 for changing the circulation manner. In order to ensure the flowing direction of the air, a fan 42 is generally provided in the air flowing passage 41. In order to improve the controlling ability to adjust the air temperature, a mixing damper also can be provided in the air flowing passage 41 so as to adjust the amount of the air that passes through the heater 23 to be heated after it passes through the cooler 33 to be cooled and to be dehydrated, thus ensuring that the temperature of the air reaching the compartment ultimately meets the requirement.

The compartment temperature is adjusted by using the air, resulting in a simple structure and the facilitation of the arrangement of various devices, and the air temperature can be further adjusted through the damper, thus improving the operability of controlling the comfort of compartment.

Figure 3:
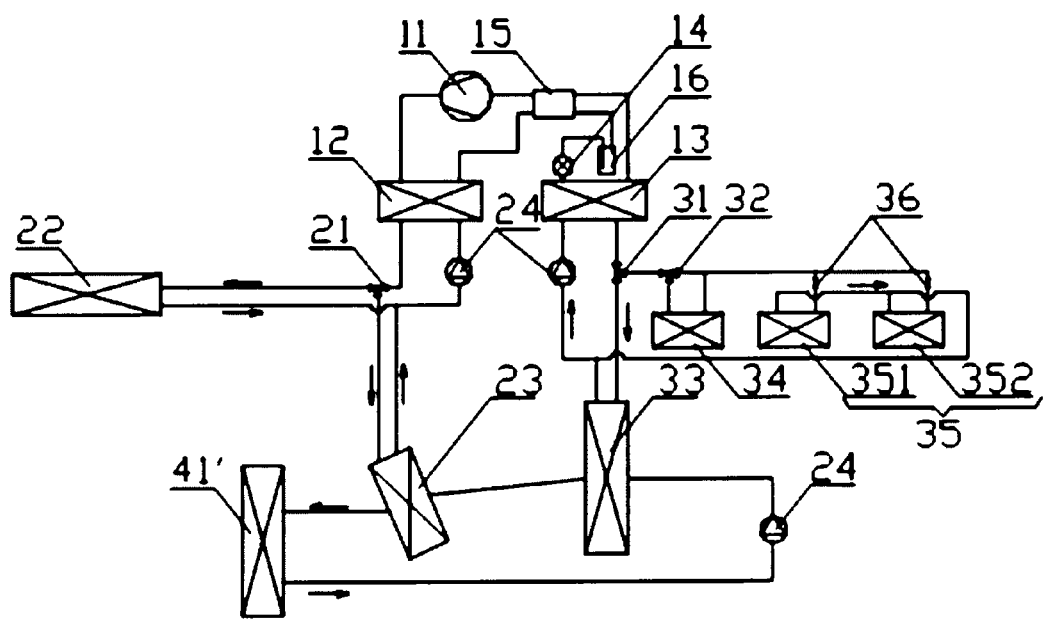
FIG. 3 is a schematic structural view of a thermal management system in the first working mode according to a second embodiment of the present application.

Referring to FIG. 3, it is a schematic structural view of a thermal management system in the first working mode according to a second embodiment of the present application.

Of course, in another specific embodiment, the compartment temperature adjusting device is a medium circulating device. The medium circulating device includes a heat exchanger 41' within the compartment. The cooler 33, the heater 23 and the heat exchanger 41' within the compartment are connected in series by pipelines. If the power pump 24 is also provided in the circulation circuit of the device, under the action of the power pump 24, the medium flows through the cooler 33 and the heater 23 to reach the heat exchanger 41' within the compartment. A heat exchange occurs between the medium and the air in the compartment, thereby achieving the adjustment of the compartment temperature. The position of the cooler 33 and the heater 23 can be adjusted arbitrarily to facilitate the arrangement of other devices. Furthermore, the heater 23 and the cooler 33 also can be of a double-flow passage structure.

Specifically, the first flow regulating valve 21 or any other flow regulating devices used to regulate the flow flowing through the heater 23 and the first air-cooled heat exchanger 22 may be a three-way proportional regulating valve, with three valve ports thereof respectively communicating with the first air-cooled heat exchanger 22, the heater 23 and the condenser 12. The three-way proportional regulating valve is a purchase part, so the manufacturing process thereof has existed, the adjustment method thereof is simple and the adjustment precision thereof is high.

Similarly, the second flow regulating valve 31 or other flow regulating devices may also be a three-way proportional regulating valve, with three valve ports thereof respectively communicating with the cooler 33, the heat exchanger 35 for heat generating components and the evaporator 13.

Of course, it is not limited to the three-way proportional regulating valve described above to adjust the flow, and other means can also be used. For example, it is also possible to provide balance regulating valves in the individual circuits respectively.

As shown, in order to enable the second air-cooled heat exchanger 34 to be selectively connected in parallel with the heat exchanger 35 for heat generating components, a three-way valve 32 can be provided in the circuit, with three valve ports of the three-way valve 32 being respectively connected with the evaporator 13, the second air-cooled heat exchanger 34 and the heat exchanger 35 for heat generating components. Of course, the three-way valve 32 may also be replaced by other devices. For example, a two-way valve is provided in the circuit of the second air-cooled heat exchanger 34, and another two-way valve is also provided in the pipeline that connects the outlet or the inlet of the second air-cooled heat exchanger 34. In contrast, the three-way valve 32 usually has simple structure and thus enables the whole structure of the thermal management system to be simpler.

The above heat exchanger 35 for heat generating components may specifically include a heat exchanger 352 for a frequency converter and a heat exchanger 351 for a battery, and of course, may also include a heat exchanger for any other heat-generating components needed to be cooled, for example, a heat exchanger for an engine, a heat exchanger for a controller (not shown), etc.

Specifically, the above heat exchanger 352 for the frequency converter, the heat exchanger 351 for the battery, the heat exchanger for the engine and the heat exchanger for the controller can be connected in parallel.

Since the normal operating temperatures of various heat generating components are not entirely consistent, when the heat exchangers of the various heat generating components are connected in parallel, a balance regulating valve 36 may be connected in the circuit of each of the heat exchanger 352 for the frequency converter, the heat exchanger 351 for the battery, the heat exchanger for the engine and the heat exchanger for the controller, so as to separately control the heat generating components, thereby ensuring that each of the heat exchangers 35 works within normal temperature range thereof.

Of course, the above heat exchanger 352 for the frequency converter, the heat exchanger 351 for the battery, the heat exchanger for the engine and the heat exchanger for the controller also can be connected in series.

An electric vehicle according to the present application includes a compartment, heat generating components and the thermal management system described above. The structures of the other parts of the electric vehicle is similar as the prior art, which will not be described in detail herein.

The electric vehicle and the thermal management system thereof according to the present application are described in detail above. The principles and the embodiments of the present application are described herein by using the specific examples, and the above description of the embodiments is only used to assist in understanding the methods and spirit of the present application. It should be noted that, for the person skilled in the art, many modifications and improvements may be made to the present application without departing from the principle of the present application, and these modifications and improvements are also deemed to fall within the protection scope of the present application defined by appended claims.

The invention claimed is:

1. A thermal management system for an electric vehicle, comprising a heat recovery cooling device, a refrigerating circuit, a heat exchanging circuit and a compartment temperature adjusting device,
   the refrigerating circuit including a compressor, a condenser, a throttling element and an evaporator that are connected by pipelines;
   the heat exchanging circuit including a first air-cooled beat exchanger and a heater, the first air-cooled heat exchanger and the heater are connected to the condenser by pipelines;
   the heat recovery cooling device including a pump, a second air cooled heat exchanger and a cooler, the second air cooled heat exchanger and the cooler are connected to the evaporator by pipelines;
   the first air-cooled heat exchanger and the heater fluidly communicate with the condenser via a first flow regulating device, the cooler and the second air cooled heat exchanger fluidly communicate with the evaporator via a second flow regulating device;
   wherein the first flow regulating device is a three-way proportional regulating valve, with three valve ports thereof fluidly communicating with the first air-cooled heat exchanger, the heater and the condenser, respectively.

2. The thermal management system for the electric vehicle according to claim 1, wherein the compartment temperature adjusting device includes an air flow passage communicating air flow through a circulation vent with a compartment of the electric vehicle and a fan arranged in the air flow passage, wherein the cooler of the heat recovery cooling device and the heater of the heat exchanging circuit are also arranged in the air flowing passage.

3. The thermal management system for the electric vehicle according to claim 1, wherein the compartment temperature adjusting device includes a compartment heat exchanger within a compartment of the electric vehicle, and
   wherein the pump, the cooler of the heat recovery cooling device, the heater of the heat exchanging circuit and the compartment heat exchanger within the compartment are connected in series by pipelines.

4. The thermal management system for the electric vehicle according to claim 1, wherein the second flow regulating device is a three-way proportional regulating valve, and three valve ports of the three-way proportional regulating valve fluidly communicate with the cooler, the evaporator, and at least one heat exchanger for heat generating components, respectively.

5. The thermal management system for the electric vehicle according to claim 4, wherein the second air-cooled heat exchanger is selectively connected with the at least one heat exchanger for heat generating components via a three-way valve in parallel, wherein three valve ports of the three-way valve are connected with the evaporator, the second air-cooled heat exchanger and the at least one heat exchanger, respectively.

6. The thermal management system for the electric vehicle according to claim 4, wherein the at least one heat exchanger for heat generating components includes a first heat exchanger for a battery and a second heat exchanger for a frequency converter.

7. The thermal management system for the electric vehicle according to claim 6, wherein the second heat exchanger for the frequency converter and the first heat exchanger for the battery are connected in parallel.

8. The thermal management system for the electric vehicle according to claim 7, wherein a balance regulating valve is connected in one circuit of the second heat exchanger for the frequency converter and one circuit of the first heat exchanger for the battery wherein the circuit of the second heat exchanger for the frequency converter and the circuit of the first heat exchanger for the battery are distinct from each other and distinct from the refrigerating circuit and heat exchanging circuit.

9. The thermal management system for the electric vehicle according to claim 1, wherein a first circulating medium in the refrigerating circuit and a second circulating medium in the heat recovery cooling device are sealed and isolated from each other; and the first circulating medium in the refrigerating circuit and a third circulating medium in the heat exchanging circuit are isolated from each other as well wherein the first, second and third circulating medium in the refrigerating circuit, the heat recovery cooling device and the heat exchanging circuit are distinct from each other.

10. The thermal management system for the electric vehicle according to claim 1, wherein the refrigerating circuit further comprises an internal heat exchanger having two passages, the two passages of the internal heat exchanger fluidly communicate with the evaporator and the compressor, and fluidly communicate with the condenser and the throttling element, respectively.

11. The thermal management system for the electric vehicle according to claim 1, wherein the heat recovery cooling devices further comprises at least one heat exchanger for heat generating components.

12. The thermal management system for the electric vehicle according to claim 11, wherein the second air-cooled heat exchanger and the at least one heat exchanger for heat generating components are selectively connected with each other in parallel.

13. An electric vehicle comprising a compartment, heat generating components and a thermal management system, the thermal management system comprising a heat recovery cooling device, a refrigerating circuit, a heat exchanging circuit and a compartment temperature adjusting device,
the refrigerating circuit including a compressor, a condenser, a throttling element and an evaporator that are connected by pipelines;
the heat exchanging circuit including a first air-cooled heat exchanger and a heater, the first air-cooled heat exchanger and the heater are connected to the condenser by pipelines;
the heat recovery cooling device including a pump, a second air cooled heat exchanger and a first cooler, the second air cooled heat exchanger and the cooler are connected to the evaporator by pipelines;
the first air-cooled heat exchanger and the heater fluidly communicate with the condenser via a first flow regulating device, the cooler and the second air cooled heat exchanger fluidly communicate with the evaporator via a second flow regulating device;
wherein the first flow regulating device is a three-way proportional regulating valve with three valve ports thereof fluidly communicating with the first air-cooled heat exchanger, the heater and the condenser, respectively.

14. The electric vehicle according to claim 13, wherein the heat recovery cooling device further comprises at least one heat exchanger for heat generating components, and wherein the second air-cooled heat exchanger and the at least one heat exchanger for heat generating components are selectively connected with each other in parallel.

15. The electric vehicle according to claim 14, wherein the second flow regulating device is a three-way proportional regulating valve with three valve ports thereof respectively fluidly communicating with the cooler, the at least one heat exchanger and the evaporator.

16. The electric vehicle according to claim 13, wherein the compartment temperature adjusting device includes an air flowing passage communicating air through a circulation vent with a compartment of the electric vehicle and a fan arranged in the air flow passage, wherein the cooler of the heat recovery cooling device and the heater of the heat exchanging circuit are also arranged in the air flowing passage.

17. The electric vehicle according to claim 13, wherein the compartment temperature adjusting device includes a compartment heat exchanger within a compartment of the electric vehicle, and
wherein the cooler of the heat recovery cooling device, the heater of the heat exchanging circuit and the compartment heat exchanger within the compartment are connected in series by pipelines.

18. The electric vehicle according to claim 13, wherein the heat exchanging circuit includes a second pump connected between the first air-cooled heat exchanger and the condenser.

* * * * *